(12) United States Patent
Perezleon et al.

(10) Patent No.: US 11,763,587 B2
(45) Date of Patent: Sep. 19, 2023

(54) DETERMINING WHETHER A USER HAS POSSESSION OF A TRANSACTION CARD AND/OR WHETHER THE USER IS AUTHORIZED TO POSSESS THE TRANSACTION CARD

(71) Applicant: Capital One Services, LLC, McLean, VA (US)

(72) Inventors: Francisco Perezleon, McLean, VA (US); Molly Johnson, McLean, VA (US); Colin Hart, McLean, VA (US); Kaitlin Newman, McLean, VA (US); Angelina Wu, McLean, VA (US); Jason Ji, McLean, VA (US); Joshua Edwards, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 149 days.

(21) Appl. No.: 17/303,905

(22) Filed: Jun. 10, 2021

(65) Prior Publication Data
US 2021/0295336 A1    Sep. 23, 2021

Related U.S. Application Data

(63) Continuation of application No. 16/594,841, filed on Oct. 7, 2019, now Pat. No. 11,037,165, which is a
(Continued)

(51) Int. Cl.
*G06Q 20/34* (2012.01)
*G06Q 20/40* (2012.01)
(Continued)

(52) U.S. Cl.
CPC ....... *G06V 30/416* (2022.01); *G06K 7/10297* (2013.01); *G06Q 20/341* (2013.01);
(Continued)

(58) Field of Classification Search
None
See application file for complete search history.

(56) References Cited

U.S. PATENT DOCUMENTS 8,875,284 B1 * 10/2014 Newstadt .............. H04L 63/145
726/22
10,438,210 B1    10/2019 Perezleon
(Continued)

*Primary Examiner* — Joseph W. King
(74) *Attorney, Agent, or Firm* — Harrity & Harrity, LLP

(57) ABSTRACT

A device receives a transaction request concerning a transaction and a transaction card from a transaction terminal, and determines, based on the transaction request, information concerning the transaction card. The device sends, based on the transaction request and to a user device, a query concerning possession of the transaction card by a user of the user device, where the query includes an instruction for the user to confirm possession of the transaction card via a component of the user device. The device receives, from the user device and after sending the query to the user device, a response concerning possession of the transaction card by the user, and determines, based on the response and the information concerning the transaction card, whether the user has possession of the transaction card. The device performs, based on determining whether the user has possession of the transaction card, at least one action.

20 Claims, 11 Drawing Sheets

100

Related U.S. Application Data continuation of application No. 16/279,465, filed on Feb. 19, 2019, now Pat. No. 10,438,210.

(51) Int. Cl.
    *G06V 30/416*     (2022.01)
    *G06K 7/10*     (2006.01)
    *G06V 40/16*     (2022.01)
    *G06V 30/10*     (2022.01)
    *G06F 18/22*     (2023.01)

(52) U.S. Cl.
    CPC ......... *G06Q 20/354* (2013.01); *G06Q 20/409* (2013.01); *G06F 18/22* (2023.01); *G06V 30/10* (2022.01); *G06V 40/172* (2022.01)

(56) References Cited

U.S. PATENT DOCUMENTS

| | | |
|---|---|---|
| 10,977,652 B1 * | 4/2021 | Twilley ................ G06Q 20/401 |
| 11,037,165 B2 | 6/2021 | Perezleon et al. |
| 2008/0035725 A1 | 2/2008 | Jambunathan et al. |
| 2011/0004498 A1 | 1/2011 | Readshaw |
| 2014/0052636 A1 | 2/2014 | Mattes |
| 2015/0120512 A1 * | 4/2015 | Chen ................ G06Q 30/0641 |
| | | 705/27.1 |
| 2016/0307186 A1 | 10/2016 | Noë et al. |
| 2019/0066113 A1 | 2/2019 | Gupta et al. |
| 2019/0089702 A1 | 3/2019 | Bhatt et al. |
| 2019/0197542 A1 * | 6/2019 | Kirby ..................... G06Q 20/12 |
| 2019/0222424 A1 | 7/2019 | Lindemann |
| 2019/0303929 A1 | 10/2019 | Brown et al. |

* cited by examiner

DETERMINING WHETHER A USER HAS POSSESSION OF A TRANSACTION CARD AND/OR WHETHER THE USER IS AUTHORIZED TO POSSESS THE TRANSACTION CARD

RELATED APPLICATION

This application is a continuation of U.S. patent application Ser. No. 16/594,841, filed Oct. 7, 2019 (now U.S. Pat. No. 11,037,165), which is a continuation of U.S. patent application Ser. No. 16/279,465, filed Feb. 19, 2019 (now U.S. Pat. No. 10,438,210), the contents of which are incorporated by reference in their entireties.

BACKGROUND

Transactions often involve use of a transaction card (e.g., a credit card, a debit card, a gift card, an automated teller machine (ATM) card, a rewards card, a client loyalty card, and/or the like) to pay for products or services at a transaction terminal (e.g., point of sale (PoS) terminal, e.g., via a swiping of the transaction card at a card reader, insertion of the transaction card into a chip reader, or wireless transmission of transaction card data to a wireless receiver. In some instances, a magnetic strip, integrated circuit (IC) chip, radio frequency (RF) antenna, and/or radio frequency identification (RFID) tag may be included in a transaction card to provide information associated with the transaction card (e.g., an account identifier, account information, a payment token, or the like).

SUMMARY

According to some implementations, a device may include one or more memories, and one or more processors, communicatively coupled to the one or more memories, configured to receive a transaction request concerning a transaction and a transaction card from a transaction terminal, and to determine, based on the transaction request, information concerning the transaction card. The one or more processors may send, based on the transaction request and to a user device, a query concerning possession of the transaction card by a user of the user device, wherein the query includes an instruction for the user to confirm possession of the transaction card via a component of the user device. The one or more processors may receive, from the user device and after sending the query to the user device, a response concerning possession of the transaction card by the user, and determine, based on the response and the information concerning the transaction card, whether the user has possession of the transaction card. The one or more processors may perform, based on determining whether the user has possession of the transaction card, at least one action.

According to some implementations, a non-transitory computer-readable medium may store instructions that include one or more instructions that, when executed by one or more processors of a device, cause the one or more processors to receive a transaction request concerning a transaction and a transaction card from a transaction terminal, and to determine, based on the transaction request, information concerning the transaction card. The one or more instructions may cause the one or more processors to send, based on the transaction request and to a user device, a first query concerning possession of the transaction card by a user of the user device, and to receive, from the user device and after sending the first query to the user device, a first response concerning possession of the transaction card by the user of the user device. The one or more instructions may cause the one or more processors to determine, based on the first response and the information concerning the transaction card, that the user of the user device has possession of the transaction card. The one or more instructions may cause the one or more processors to send, to the user device and based on determining that the user of the user device has possession of the transaction card, a second query concerning identification of the user of the user device. The one or more instructions may cause the one or more processors to receive, from the user device and after sending the second query to the user device, a second response concerning identification of the user of the user device, and to determine, based on the second response and the information concerning the transaction card, that the user of the user device is authorized to possess the transaction card. The one or more instructions may cause the one or more processors to perform, based on determining that the user of the user device has possession of the transaction card and determining that the user of the user device is authorized to possess the transaction card, at least one action.

According to some implementations, a method may include receiving, by a device, a transaction request concerning a transaction and a transaction card from a transaction terminal, and determining, by the device and based on the transaction request, information concerning the transaction card. The method may include sending, by the device and based on the transaction request, to a user device a query concerning possession of the transaction card by a user of the user device, and receiving, by the device and after sending the query to the user device, from the user device a response concerning possession of the transaction card by the user. The method may include determining, by the device and based on the response and the information concerning the transaction card, that the user does not have possession of the transaction card. The method may include performing, by the device and based on determining that the user does not have possession of the transaction card, at least one action.

DETAILED DESCRIPTION

Figure 1A:
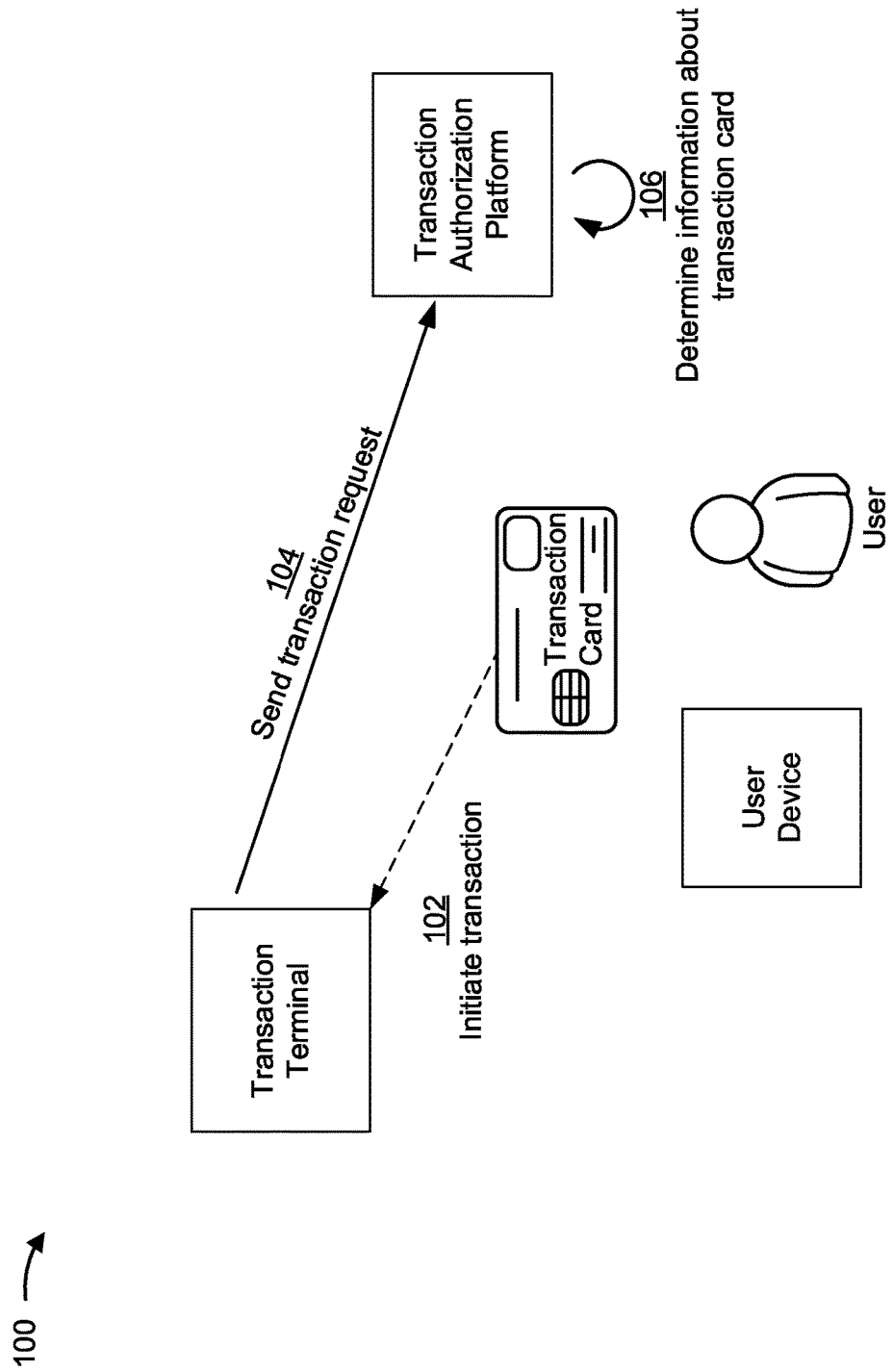
FIGS. 1A-1F are diagrams of an example implementation described herein.

The following detailed description of example implementations refers to the accompanying drawings. The same reference numbers in different drawings may identify the same or similar elements.

A person may initiate a card-present transaction by inputting a transaction card into a slot of a transaction terminal, such as point of sale (PoS) terminal, an automated teller machine (ATM) terminal, and/or the like. In some cases, a transaction backend device flags the transaction card as potentially compromised (e.g., that the transaction card was lost or stolen, that the transaction card is associated with potentially fraudulent activity, and/or the like) and prevents the transaction from completing. In some cases, the transaction backend device can allow the transaction and monitor future transaction activity of the transaction card. However, in many of these cases, the transaction card has in fact been compromised, which results in the transaction backend device, as well as potentially other devices, using substantial resources (e.g., processor resources, memory resources, power resources, communication resources, and/or the like) to correct and/or mitigate any fraudulent transactions.

Some implementations described herein provide a transaction authorization platform that determines, during a card-present transaction initiated by a person presenting a transaction card to a transaction terminal, whether a user of a user device has possession of the transaction card (e.g., whether the person has access to the user device associated with the transaction card (e.g., whether the transaction card is linked to the user device)) and/or whether the user of the user device is authorized to possess the transaction card (e.g., whether the person, who may have access to the user device, is authorized to possess the transaction card (e.g., use the transaction card to conduct card-present transactions)). In some implementations, the transaction authorization platform receives a transaction request, concerning a transaction and a transaction card, from a transaction terminal and determines, based on the transaction request, information concerning the transaction card. In some implementations, the transaction authorization platform sends a first query and receives a first response concerning possession of the transaction card by the user of the user device. In some implementations, the transaction authorization platform determines, based on the first response and the information concerning the transaction card, that the user of the user device has possession of the transaction card. In some implementations, the transaction authorization platform sends a second query and receives a second response concerning identification of the user of the user device. In some implementations, the transaction authorization platform determines, based on the second response and the information concerning the transaction card, that the user of the user device is authorized to possess the transaction card. In some implementations, the transaction authorization platform performs, or causes to be performed, at least one action based on determining whether the user of the user device has possession of the transaction card and/or whether the user of the user device is authorized to possess the transaction card.

In this way, the transaction authorization platform can, while processing a card-present transaction, determine whether the user of the user device has possession of the transaction card and/or that the user of the user device is authorized to use the transaction card, which can facilitate determining whether to allow the transaction. Accordingly, the transaction authorization platform can decline a card-present transaction where the person presenting the transaction card does not have a user device associated with the transaction card and/or the person is not authorized to use the transaction card. This can reduce fraudulent card-present transactions, by ensuring that only the user of the user device associated with the transaction card may conduct the card-present transaction, which therefore conserves any computing resources (e.g., processing resources, memory resources, power resources, and/or the like) and/or network resources involved in correcting any fraudulent activity that would have been allowed without the use of the transaction authorization platform described herein. Moreover, this enables the user of the user device to immediately address any security concern regarding the transaction card during the transaction, which can improve the user experience of the user of the user device. In addition, a transaction terminal manufacturer can provide a transaction terminal that includes fewer components that identify or authenticate the person presenting the transaction card for a card-present transaction (e.g., a camera, a biometric reader, and/or the like), which simplifies the design and manufacture of the transaction terminal, thereby reducing the technical complexity of the transaction terminal, and accordingly reduces costs to manufacture and maintain the transaction terminal. This also reduces wear and tear of the transaction terminal that would otherwise utilize the components that identify or authenticate the person presenting the transaction card for the card-present transaction.

FIGS. 1A-1F are diagrams of an example implementation 100 described herein. As shown in FIG. 1A, example implementation 100 may include a transaction terminal, a transaction authorization platform, a transaction card, and/or a user device operated by a user (e.g., an owner of the transaction card, an authorized user of the transaction card, and/or the like). In some implementations, the transaction terminal may be an electronic telecommunications device, such as a point of sale (PoS) terminal, a security access terminal, an automated teller machine (ATM) terminal, and/or the like that enables a user to perform a transaction, such as a purchase, a return, a cash withdrawal, a deposit, a transfer of funds, and/or the like. The transaction terminal may include a display device, a physical input interface (e.g., a keypad, a keyboard, a touchscreen display, a touch capacitive screen display, and/or the like), a slot for receiving the transaction card, and/or one or more other components (e.g., a printer for printing a receipt, a camera for capturing an image of the user, and/or the like).

In some implementations, the transaction authorization platform may be a computing device, a server, a cloud computing device, and/or the like that monitors and/or authorizes one or more transactions of the transaction terminal. In some implementations, the transaction card may be a physical card capable of storing data and/or communicating the data to facilitate a transaction. In some implementations, the transaction card may include one or more features and/or one or more components for storing the data, such as a string, an account number, a bar code, a magnetic strip, a quick response (QR) code, an integrated circuit (IC) chip, and/or the like. For example, the transaction card may include a magnetic strip and/or an IC chip, such as a EUROPAY®, MASTERCARD®, VISA® (EMV) chip, or the like). In some implementations, the IC chip may be able to execute one or more instructions (e.g., computer code), encrypt and/or decrypt data, perform processing functions, and/or the like. In some implementations, the transaction card may be a virtual card stored in a mobile wallet, virtual wallet, and/or the like of the user device. In some implementations, the transaction card may be associated with the user of the user device (e.g., the user of the user device is an owner of the transaction card, an authorized user of the transaction card, and/or the like) In some implementations, the user device may be a communication and/or computing device, such as a mobile phone, a smartphone, a laptop computer, a tablet computer, and/or the like, that includes a camera device, a microphone, a biometric sensor (e.g., a fingerprint reader, a retina scanner, and/or the like), a display, a speaker, and/or a wireless transceiver, such as a near field communication (NFC) transceiver, a Bluetooth transceiver, and/or the like.

Some example implementations described herein concern a single transaction terminal, transaction authorization platform, transaction card, user, and/or user device, but implementations may include a plurality of transaction terminals, transaction authorization platforms, transaction cards, user devices, and/or users. In some implementations, the transaction terminal, the transaction authorization platform, and/or the user device may be connected via a network, such as the internet, an intranet, and/or the like.

As shown by reference number 102, a person (e.g., a holder of the transaction card, or another person, such as a cashier, a sales representative, and/or the like) may interact with the transaction terminal to initiate a card-present transaction (e.g., a purchase, a cash withdrawal, a money transfer, and/or the like). In some implementations, the person may be the user of the user device (e.g., the owner of the transaction card, the authorized user of the transaction card, and/or the like). In some implementations, the person may not be the user of the user device (e.g., a bad actor, such as an unauthorized user of the transaction card). In some implementations, the person may interact with the transaction terminal by entering information via the input interface of the transaction terminal and/or inputting the transaction card via the slot of the transaction terminal (e.g., by inserting the transaction card, by swiping the transaction card, and/or the like) to initiate the transaction. In some implementations, the transaction terminal may obtain the data stored by the transaction card by accessing and/or reading the one or more features and/or the one or more components of the transaction card.

As shown by reference number 104, the transaction terminal may send a transaction request to the transaction authorization platform. In some implementations, the transaction request may concern the transaction, the transaction card, the transaction terminal, and/or the like. For example, the transaction request may include the information entered via the input interface of the transaction terminal. As another example, the transaction request may include the data stored by the transaction card. In some implementations, the transaction request may indicate a type of the transaction, such as a magnetic strip based transaction, a QR code based transaction, an IC chip based transaction, and/or the like.

As shown by reference number 106, the transaction authorization platform may receive the transaction request and determine, based on the transaction request, information about the transaction card. For example, the transaction authorization platform may parse the transaction request to determine and/or identify the data stored by the transaction card and look up, based on the data stored by the transaction card, the information about the transaction card. In some implementations, the information about the transaction card may include information about an authorized user of the transaction card; an organization associated with the transaction card; an account associated with the transaction card; an amount of money associated with the transaction card; an image associated with the transaction card; whether the transaction card has been flagged as possibly compromised (e.g., whether the transaction card has been lost and/or stolen, possibly subject to fraud, and/or the like), whether magnetic strip based transactions, IC chip based transactions, and/or the like are allowed for a period of time, whether card-present transactions (e.g., transactions where the transaction card is presented to a transaction terminal), card-not-present transactions (e.g., transactions where the transaction card is not presented to a transaction terminal, such as over-the-phone transactions, web form transactions, and/or the like), and/or the like, are allowed for the period of time; and/or the like.

Figure 1B:
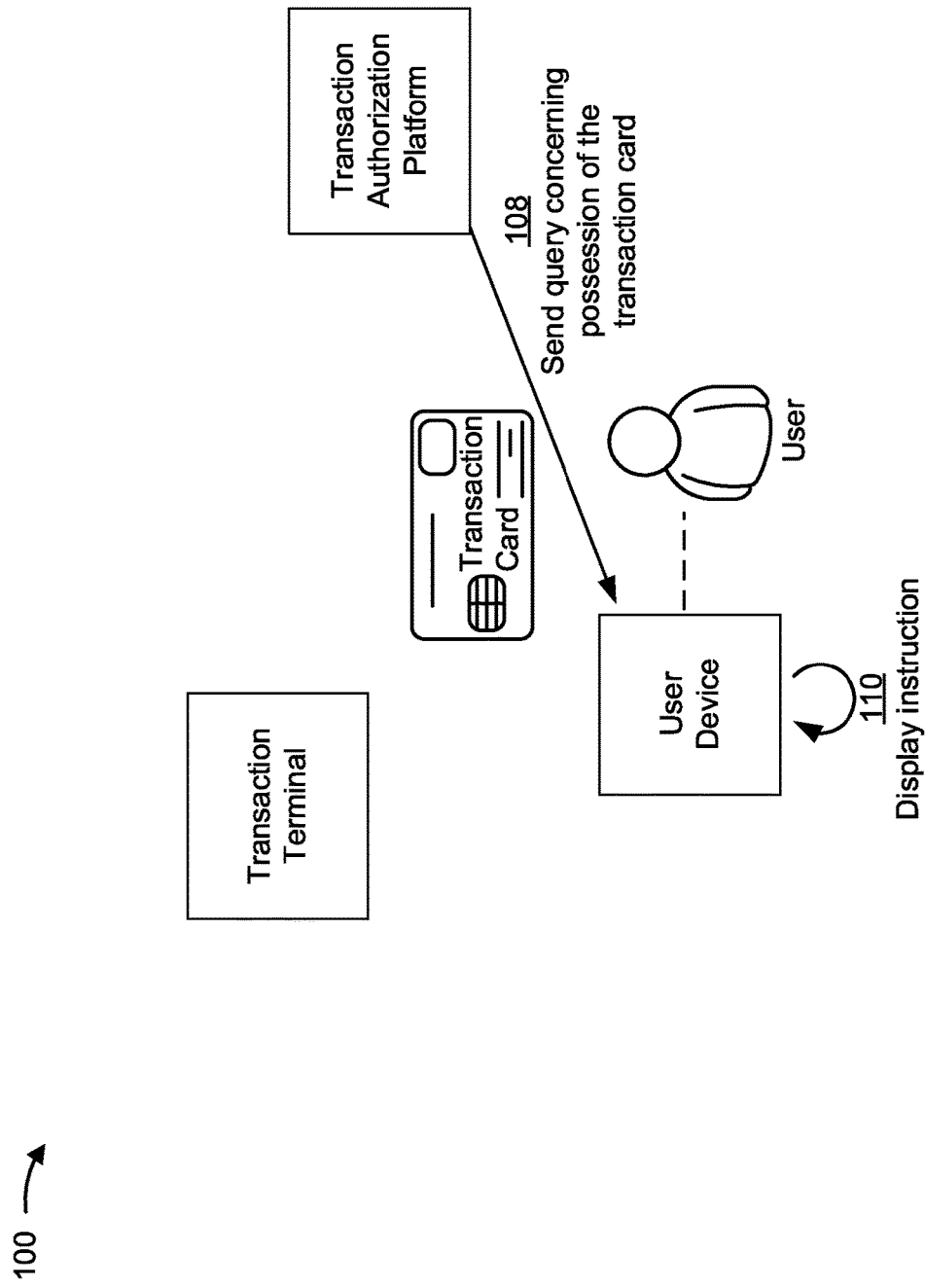

As shown in FIG. 1B and by reference number 108, the transaction authorization platform may send (e.g., via an electronic message, such as a text message, and email message, a push message, an automated phone call, and/or the like), based on the transaction request, a query concerning possession of the transaction card by the user of the user device (also referred to herein as "the user") to the user device. For example, the transaction authorization platform may send a query that includes an instruction for the user to confirm possession of the transaction card via the user device. In some implementations, the instruction may indicate that the user is to confirm possession of the transaction card via a component of the user device, such as the camera device of the user device, the wireless transceiver of the user device, and/or the like. In some implementations, the transaction authorization platform may send a message to the transaction terminal to cause the transaction terminal to display the message on a display of the transaction terminal. The message may indicate that the user is to use the user device to confirm possession of the transaction card (e.g., the transaction authorization platform may display "Please continue this authorization process on your user device"). As shown by reference number 110, the user device may receive the query and may display the instruction on the display of the user device, may present the instruction via the speaker of the user device, and/or the like. In some implementations, the user device may cause display, presentation, and/or the like, of the instruction, based on receiving the query.

In some implementations, the user may read the instruction on the display of the user device, listen to the instruction emitted from the speaker of the user device, and/or the like, and present, based on the instruction, the transaction card to the user device and/or the component of the user device to confirm possession of the transaction card. For example, the user may hold the transaction card near the user device so that the wireless transceiver may communicate with the transaction card, may place the transaction card in a field of view of the camera device so that the camera device may capture an image of the transaction card, and/or the like. In some implementations, the user may read the message on the display of the transaction terminal and cause, based on the message, the user device to run an application on the user device for the user device to interact with the transaction card, and present, based on causing the user device to run the application, the transaction card to the user device and/or the component of the user device to confirm possession of the transaction card.

Figure 1C:
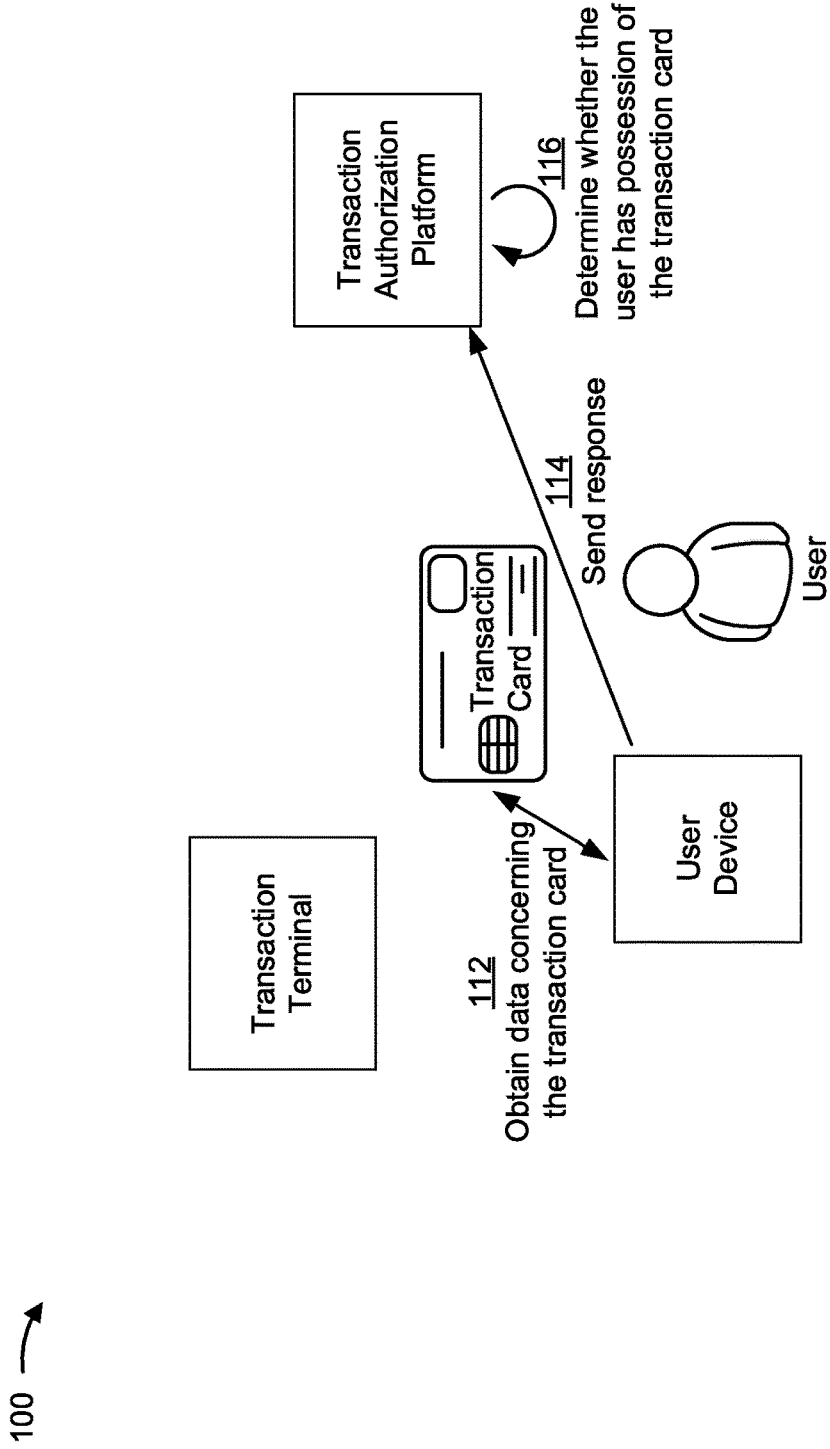

As shown in FIG. 1C, and by reference number 112, the user device may obtain data concerning the transaction card, such as some or all of the data saved on the transaction card. In some implementations, the query may cause the user device to operate the component of the user device, such as the camera device, the wireless transceiver, and/or the like, to obtain the data concerning the transaction card. For example, the query may cause the user device to operate an NFC transceiver of the user device to communicate with the IC chip of the transaction card to determine IC chip data concerning the transaction card. As another example, the query may cause the user device to operate a camera device of the user device to obtain image data concerning the transaction card. In an additional example, the query may cause the user device to operate the camera device to obtain a plurality of images that includes at least one image of a front of the transaction card and at least one image of a back of the transaction card.

As shown by reference number 114, the user device may send a response concerning possession of the transaction card by the user to the transaction authorization platform. In some implementations the response may be based on and/or include the data concerning the transaction card. For example, the response may be based on and/or include the IC chip data, the image data, the plurality of images, and/or the like. As another example, user device may run an application (e.g., an applet, a program, and/or the like) included in the IC chip data to generate and send the response.

As shown by reference number 116, the transaction authorization platform may receive the response and determine whether the user has possession of the transaction card. In some implementations, the transaction authorization platform may process the response and/or the information concerning the transaction card to determine whether the user has possession of the transaction card. For example, the transaction authorization platform may determine whether the person presenting the transaction card is the user based on the response and/or the information concerning the transaction card to determine whether the user has possession of the transaction card. In some implementations, the transaction authorization platform may determine that the user has possession of the transaction card. For example, the transaction authorization platform may determine that the user has possession of the transaction card if the response (received from the user device) is associated with (e.g., matches, corresponds with, relates to, concerns, and/or the like) the information (received from the transaction terminal) concerning the transaction card. In some implementations, the transaction authorization platform may determine that the user does not have possession of the transaction card. For example, the transaction authorization platform may determine that the user does not have possession of the transaction card if the response (received from the user device) is not associated with (e.g., does not match, does not correspond with, does not relate to, does not concern, and/or the like) the information concerning the transaction card (received from the transaction terminal). As another example, the transaction authorization platform may determine that the user does not have possession of the transaction card if the transaction authorization platform does not receive a response (e.g., no response was sent by the user device, the response was not successfully transmitted to the transaction authorization platform, and/or the like).

In some implementations, where the response includes the IC chip data, the transaction authorization platform may determine whether the user has possession of the transaction card based on the IC chip data and/or the information concerning the transaction card. For example, the transaction authorization platform may compare the IC chip data and the information concerning the transaction card to determine whether the IC chip data is associated with the information concerning the transaction card. As another example, the transaction authorization platform may compare the IC chip data and the information concerning the transaction card to determine whether some or all of the IC chip data is accurate within a tolerance. In another example, the transaction authorization platform may compare the IC chip data and the information concerning the transaction card to determine whether an application transaction counter (ATC) value associated with the IC chip and/or the IC chip data is accurate within a tolerance.

In some implementations, where the response includes the image data, the transaction authorization platform may determine whether the user has possession of the transaction card based on the image data and the information concerning the transaction card. For example, the transaction authorization platform may process the image data using an optical character recognition (OCR) technique to determine at least one feature of the transaction card (e.g., a string, account number, and/or the like), and/or using other image processing to decode a bar code, a QR code, and/or the like, and may determine whether the at least one feature is associated with the information concerning the transaction card. Moreover, the transaction authorization platform may process the image data to determine whether the image data was captured using a camera of the user device (e.g., the image data was not stored in a photo library of the user device) and/or whether the image data was obtained by the user device within a threshold period of time after the transaction authorization platform received the transaction request (e.g., the image data was obtained during the transaction). As another example, the transaction authorization platform may process the image data using an image processing technique to determine one or more images of the transaction card and determine whether the one or more images are associated with the information concerning the transaction card (e.g., whether the one or more images match or are similar to at least one image of the transaction card included in the information concerning the transaction card).

In some implementations, where the response includes the plurality of images, the transaction authorization platform may determine whether the user has possession of the transaction card based on the plurality of images and the information concerning the transaction card. For example, the transaction authorization platform may determine that the plurality of images contain image information that is associated with the information concerning the transaction card. Additionally, or alternatively, the transaction authorization platform may compare the at least one image of the front of the transaction card and the at least one image of the back of the transaction card, of the plurality of images. In this way, the transaction authorization platform may determine that the transaction card presented by the user is authentic if the at least one image of the front of the transaction card corresponds with the at least one image of the back of the transaction card.

Figure 1D:
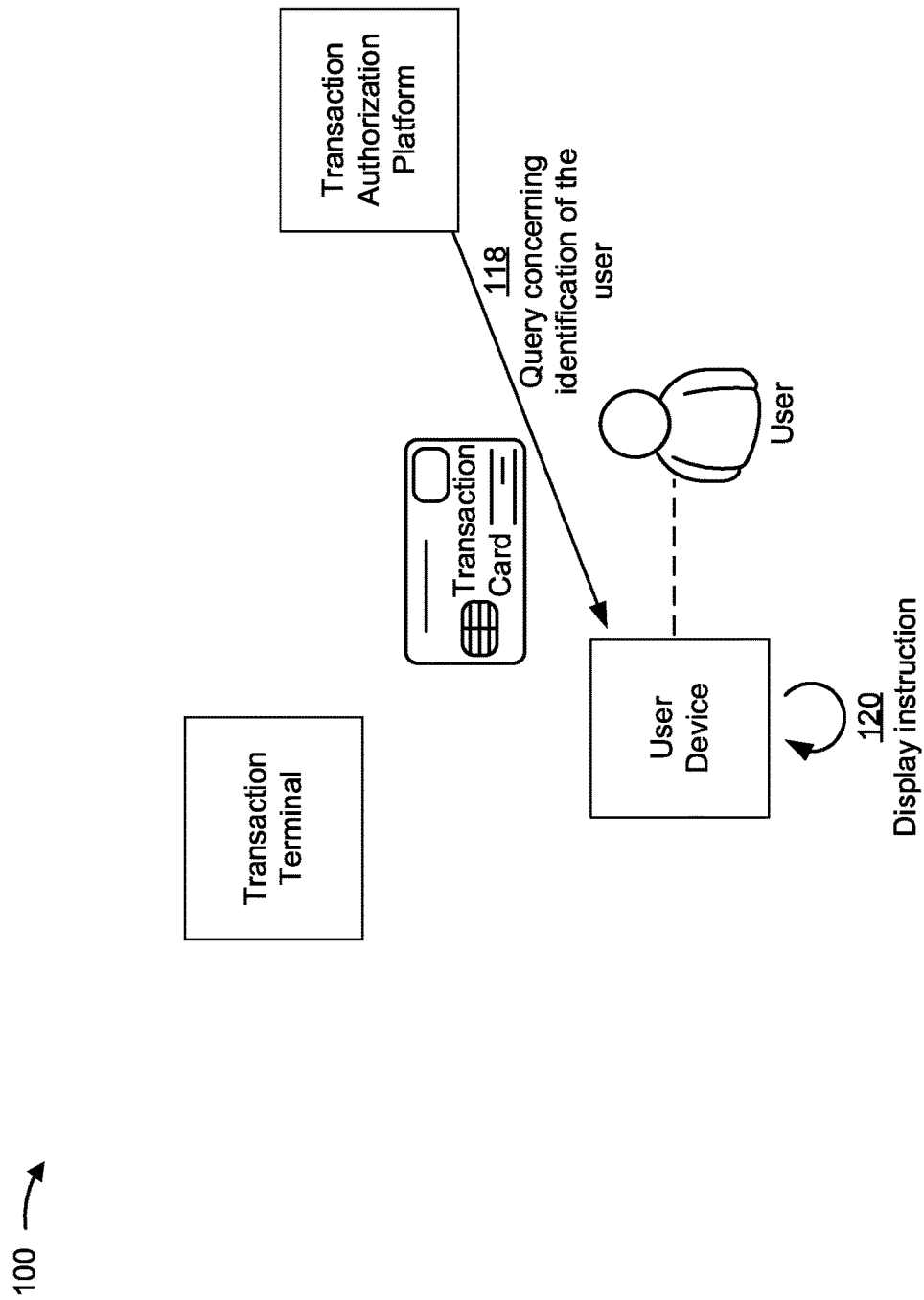

Additionally, the transaction authorization platform may determine whether the user is authorized to possess and/or use the transaction card. As shown in FIG. 1D and by reference number 118, the transaction authorization platform may send a query concerning identification of the user and/or the transaction card. In some implementations, the transaction authorization platform may send the query based on the transaction request and/or determining that the user has possession of the transaction card. The transaction authorization platform may send a query that includes an instruction for the user to provide identification via the user device. In some implementations, the instruction may indicate that the user is to provide identification of the user via a component of the user device, such as the camera device of the user device, the microphone of the user device, the wireless transceiver of the user device, and/or the like. In some implementations, the instruction may indicate that the user is to answer at least one security question associated with user and/or user device; present an identification card of the user, one or more parts of the user's body, a voice of the user, and/or the like; and/or the like. As shown by reference number 120, the user device may receive the query and may display the instruction on the display of the user device. In some implementations, the user device may cause display of the instruction based on receiving the query.

In some implementations, the user may read the instruction on the display of the user device and, based on the instruction, provide an answer to the at least one security question and/or present an identification card of the user, one or more parts of the user's body, a voice of the user, and/or the like to the user device and/or the component of the user device to confirm possession of the transaction card. For example, the user may enter the answer to the at least one security question via a user interface of the user device (e.g., a touchscreen display of the user device). In another example, the user may hold the identification card near the user device so that the wireless transceiver may communicate with the identification card, may place the identification card in a field of view of the camera device so that the camera device may capture an image of the identification card, and/or the like. As another example, the user may point the camera device of the user device at the face of the user so that the camera device may capture at least one image of the user's face and/or a facial expression, may place a finger of the user on the biometric sensor of the user device so that the biometric sensor may obtain a fingerprint of the user, and/or the like. In another example, the user may utter one or more words so that the microphone of the user device may capture the one or more words, a voice of the user, and/or the like. The one or more words may be the answer to the at least one security question.

Figure 1E:
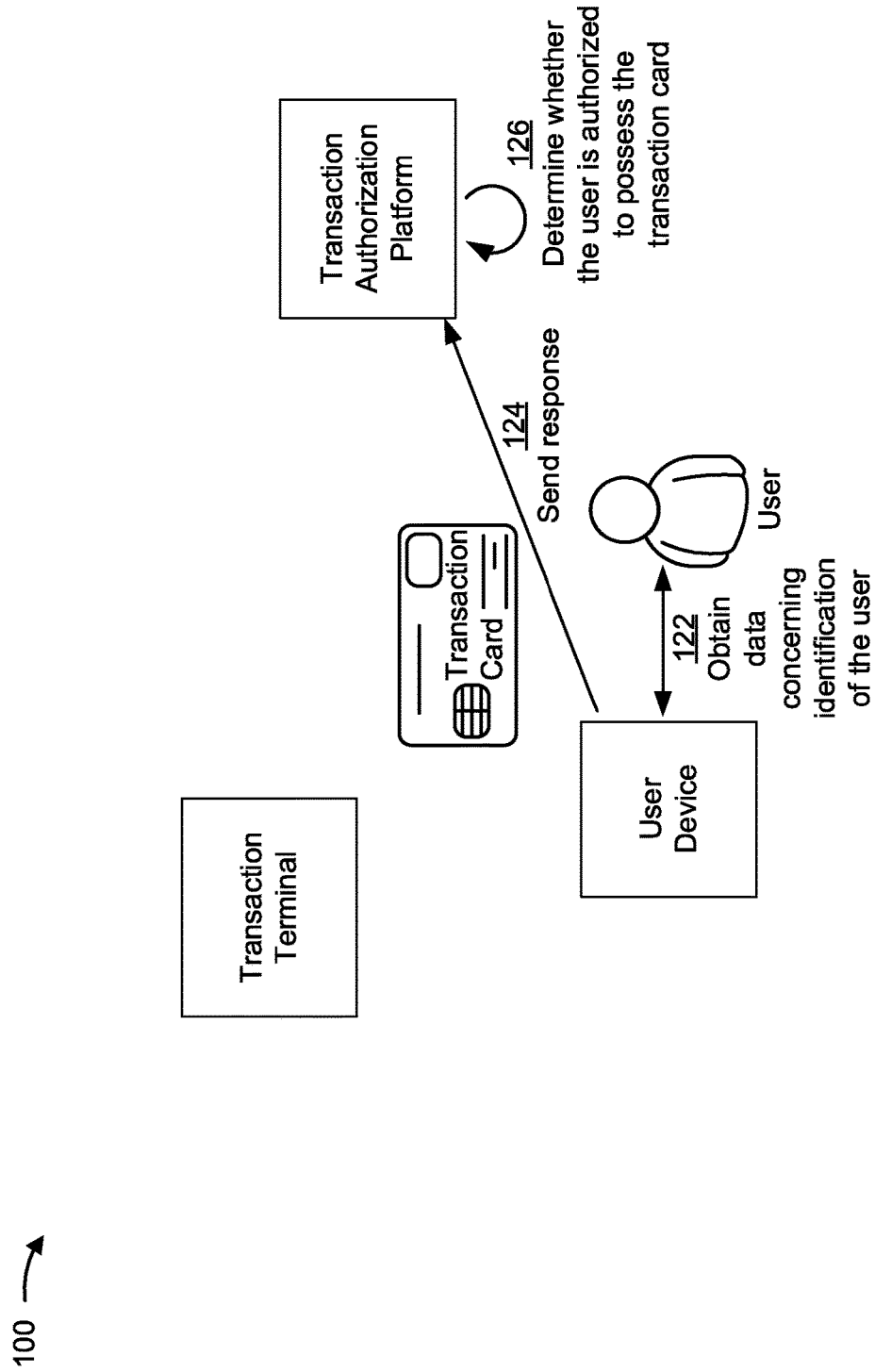

As shown in FIG. 1E and by reference number 122, the user device may obtain data concerning identification of the user. In some implementations, the query may cause the user device to operate a component of the user device, such as the microphone, the camera device, the wireless transceiver, and/or the like, to obtain the data concerning identification of the user. For example, the query may cause the user device to operate the microphone of the user to obtain audio data concerning identification of the user. In some implementations, the audio data may include the one or more words, the voice of the user, a voice characteristic, and/or the like of the user. As another example, the query may cause the user device to operate the camera device to obtain image data concerning identification of the user. In some implementations, the image data may include at least one image of the identification card. In some implementations, the image data may include the at least one image of the face, the facial expression, a visual characteristic, and/or the like of the user. In another example, the query may cause the user device to operate the biometric sensor to obtain biometric data concerning identification of the user. In some implementations, the biometric data may include the fingerprint, a retina, a biometric characteristic and/or the like of the user.

As shown by reference number 124, the user device may send a response concerning identification of the user to the transaction authorization platform. In some implementations the response may be based on and/or include the data concerning identification of the user. For example, the response may be based on and/or include the audio data, the image data, the biometric data, and/or the like.

As shown by reference number 126, the transaction authorization platform may receive the response concerning identification of the user and determine whether the user is authorized to possess the transaction card (e.g., whether the user is authorized to use the transaction card to conduct card-present transactions). In some implementations, the transaction authorization platform may process the response and/or the information concerning the transaction card to determine whether the user is authorized to possess the transaction card. In some implementations, the transaction authorization platform may determine that the user is authorized to possess the transaction card. For example, the transaction authorization platform may determine that the user is authorized to possess the transaction card if the response (received from the user device) is associated with (e.g., matches, corresponds with, relates to, concerns, and/or the like) the information concerning the transaction card (received from the transaction terminal). In some implementations, the transaction authorization platform may determine that the user is not authorized to possess the transaction card. For example, the transaction authorization platform may determine that the user is not authorized to possess the transaction card if the response (received from the user device) is not associated with (e.g., does not match, correspond with, relate to, concern, and/or the like) the information concerning the transaction card (received from the transaction terminal).

In some implementations, where the response includes the audio data, the transaction authorization platform may determine whether the user is authorized to possess the transaction card based on the audio data and/or the information concerning the transaction card. For example, the transaction authorization platform may process the audio data to determine the one or more words and determine that at least one of the one or more words matches a password included in the information concerning the transaction card. As another example, the transaction authorization platform may process the audio data to determine the voice of the user and determine, based on the information concerning the transaction card, that the voice corresponds with a voice profile of an authorized user of the transaction card.

In some implementations, where the response includes the image data, the transaction authorization platform may determine whether the user is authorized to possess the transaction card based on the image data and the information concerning the transaction card. For example, the transaction authorization platform may process the image data to determine the at least one image of the face and determine, based on the information concerning the transaction card, whether the at least one image of the face is associated with a facial profile of an authorized user of the transaction card. As another example, the transaction authorization platform may process the image data to determine the at least one image of the identification card and determine whether the at least one image of the identification card contains image information that is associated with the information concerning the transaction card.

Figure 1F:
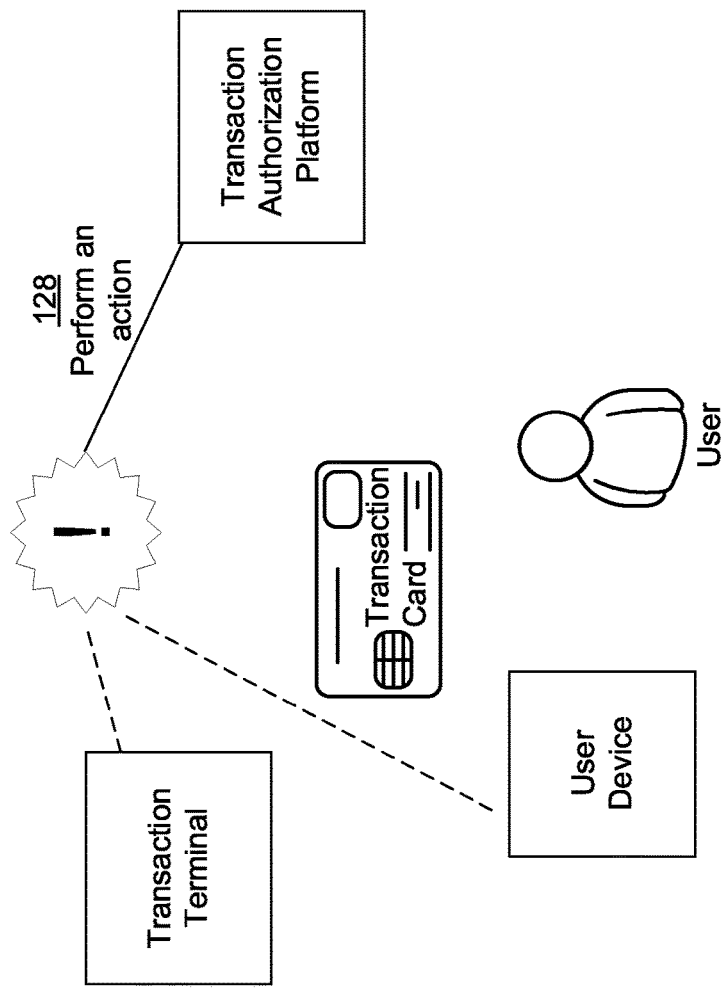

As shown in FIG. 1F and reference number 128, the transaction authorization platform may perform, or cause to be performed, at least one action. In some implementations, the transaction authorization platform may perform, or cause to be performed, the at least one action based on determining whether the user has possession of the transaction card and/or determining whether the user is authorized to possess the transaction card.

In some implementations, the at least one action includes sending a message, such as a signal, command, instruction, and/or the like, to the transaction terminal or an additional device. In some implementations, where the transaction authorization platform determines that the user has possession of the transaction card and/or that the user is authorized to possess the transaction card, the message may indicate that the transaction is allowed and/or the message may cause the transaction terminal or the additional device to allow the transaction. For example, the transaction authorization platform may send the message to the transaction terminal to cause the transaction terminal to allow the transaction. In some implementations, where the transaction authorization platform determines that the user does not have possession of the transaction card and/or that the user is not authorized to possess the transaction card, the message may indicate that the transaction is not allowed and/or the message may cause the transaction terminal or the additional device to decline the transaction.

In some implementations, the at least one action includes cancelling the transaction card and/or causing a new transaction card to be issued to the user. For example, where the transaction authorization platform determines that the user does not have possession of the transaction card and/or that the user is not authorized to possess the transaction card, the transaction authorization platform may cancel the transaction card and/or initiate issuance of a new transaction card to the user. In another example, where the transaction authorization platform determines that the user does not have possession of the transaction card and/or that the user is not authorized to possess the transaction card, the transaction authorization platform may cause the transaction terminal or the additional device to cancel the transaction card and/or initiate issuance of a new transaction card to the user.

In some implementations, the at least one action includes updating the information concerning the transaction card. In some implementations, where the transaction authorization platform determines that the user has possession of the transaction card and/or that the user is authorized to possess the transaction card, the transaction authorization platform may update the information concerning the transaction card to indicate that the user had possession of the transaction card and/or that the user was authorized to possess the transaction card at the time of the transaction; that the transaction card has not been compromised; that magnetic strip based transactions, IC chip based transactions, and/or the like are allowed for a period of time (e.g., a day, a week, a month, and/or the like); that card-present transactions (e.g., transactions where the transaction card is presented to a transaction terminal) are allowed for the period of time and/or card-not-present transactions (e.g., transactions where the transaction card is not presented to a transaction terminal, such as over-the-phone transactions, web form transactions, and/or the like) are allowed for the period of time; and/or the like.

In some implementations, where the transaction authorization platform determines that the user does not have possession of the transaction card and/or that the user is not authorized to possess the transaction card, the transaction authorization platform may update the information concerning the transaction card to indicate that the user did not have possession of the transaction card and/or that the user was not authorized to possess the transaction card at the time of the transaction; that the transaction card may be compromised; that magnetic strip based transaction requests, IC chip based transaction requests, and/or the like are not allowed for a period of time (e.g., a day, a week, a month, and/or the like); that card-present transactions are not allowed for the period of time, that card-not-present transactions are not allowed for the period of time; and/or the like. In some implementations, the transaction authorization platform may initiate fraud processing proceedings concerning the transaction card (e.g., cause particular transaction card transactions to be marked as fraudulent, cause the user to confirm that the particular transaction card transactions were fraudulent, and/or the like).

As indicated above, FIGS. 1A-1F are provided merely as an example. Other examples may differ from what is described with regard to FIGS. 1A-1F.

Figure 2:
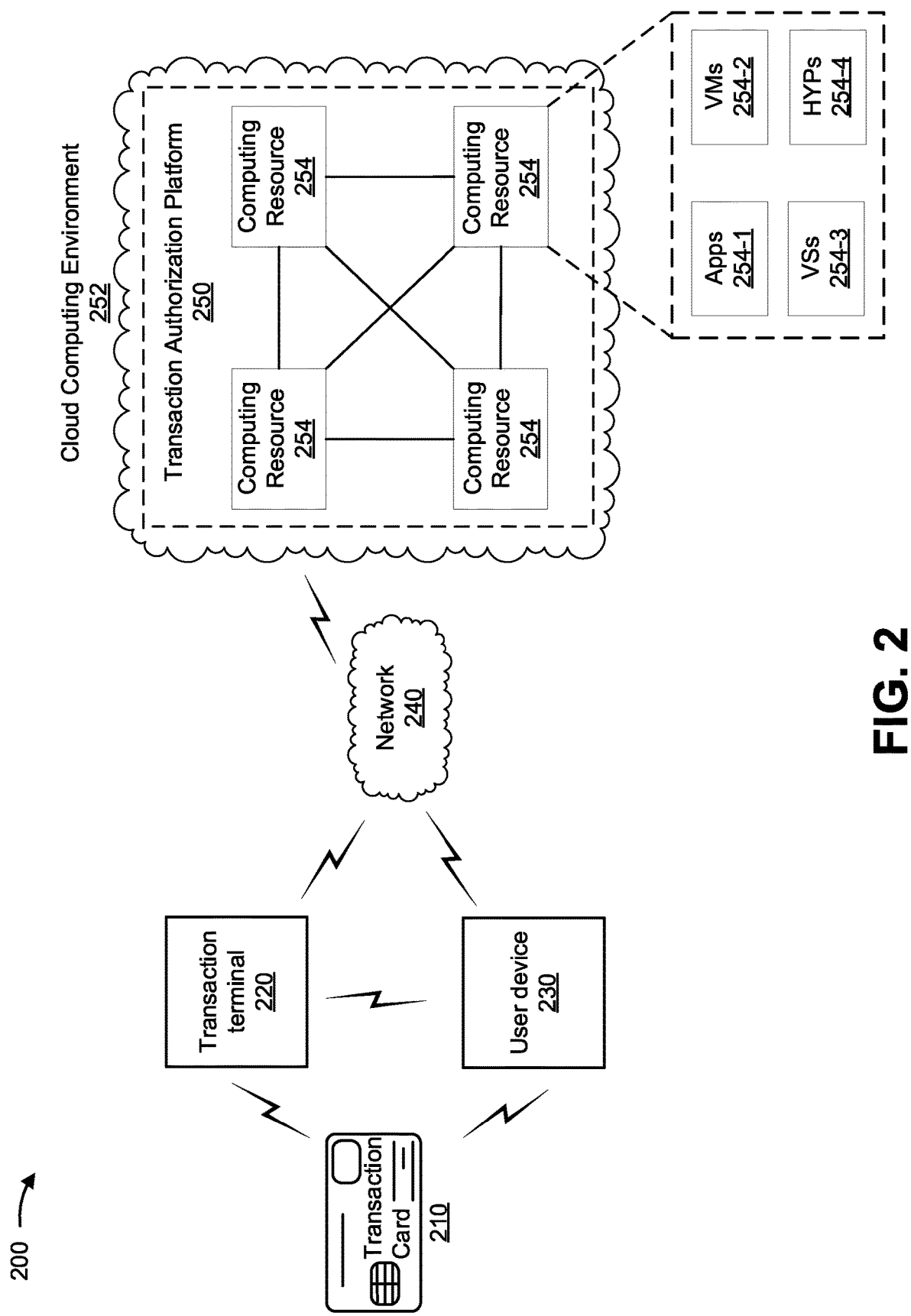
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a transaction card 210, a transaction terminal 220, a user device 230, a network 240, a transaction authorization platform 250, and/or the like. Devices of environment 200 may interconnect via wired connections, wireless connections, or a combination of wired and wireless connections.

Transaction card 210 includes a transaction card capable of storing data and/or communicating the data to facilitate a transaction. Transaction card 210 is capable of storing and/or communicating data for a point of sale (PoS) transaction with transaction terminal 220. For example, transaction card 210 may store or communicate data including account information (e.g., an account identifier, a cardholder identifier, etc.), expiration information of transaction card 210, banking information, transaction information (e.g., a payment token), and/or the like. In some implementations transaction card 210 may include one or more features and/or one or more components for storing and communicating the data, such as a string, an account number, a bar code, a magnetic strip, a quick response (QR) code, an integrated circuit (IC) chip, and/or the like. For example, to store or communicate the data, transaction card 210 may include a magnetic strip and/or an integrated circuit (IC) chip (e.g., a EUROPAY®, MASTERCARD®, VISA® (EMV) chip, or the like).

In some implementations, transaction card 210 may include an antenna to communicate data associated with transaction card 210. The antenna may be a passive radio frequency (RF) antenna, an active RF antenna, and/or a battery-assisted RF antenna. In some implementations, transaction card 210 may be a smart transaction card, capable of communicating wirelessly (e.g., via Bluetooth, Bluetooth Low Energy (BLE), near-field communication (NFC), and/or the like) with a computing device, such as transaction terminal 220, user device 230, a digital wallet, and/or another device. In some implementations, transaction card 210 may communicate with transaction terminal 220 to complete a transaction (e.g., based on being moved within communicative proximity of transaction terminal 220). In some implementations, transaction card 210 may communicate with user device 230 to facilitate a user of the user device 230 verifying that the user has possession of the transaction card 210 (e.g., based on being moved within communicative proximity of user device 230).

Transaction terminal 220 includes one or more devices capable of receiving, generating, storing, processing, and/or providing information associated with facilitating a transaction (such as a PoS transaction). For example, transaction terminal 220 may include a communication device and/or computing device capable of receiving data from transaction card 210 and/or processing a transaction based on the data. In some implementations, transaction terminal 220 may include a desktop computer, a laptop computer, a tablet computer, a handheld computer, and/or a mobile phone (e.g., a smart phone, a radiotelephone, etc.). Transaction terminal 220 may be owned and/or operated by one or more individuals or businesses engaged in a sale of goods or services (e.g., one or more merchants, vendors, service providers, and/or the like).

Transaction terminal 220 may include one or more devices to facilitate processing a transaction via transaction card 210. Transaction terminal 220 may include a PoS terminal, a security access terminal, an ATM terminal, and/or the like. Transaction terminal 220 may include one or more input devices and/or output devices to facilitate obtaining transaction card data from transaction card 210 and/or interaction or authorization from a cardholder of transaction card 210. Example input devices of transaction terminal 220 may include a number keypad, a touchscreen, a magnetic strip reader, a chip reader, and/or an RF signal reader. A magnetic strip reader of transaction terminal 220 may receive transaction card data as a magnetic strip of transaction card 210 is swiped along the magnetic strip reader. A chip reader of transaction terminal 220 may receive transaction card data from an IC chip (e.g., an EMV chip) of transaction card 210 when the chip is placed in contact with the chip reader. An RF signal reader of transaction terminal 220 may enable contactless transactions from transaction card 210 by obtaining transaction card data wirelessly from transaction card 210 as transaction card 210 comes within a range of transaction terminal 220 that the RF signal reader may detect an RF signal from an RF antenna of transaction card 210. Example output devices of transaction terminal 220 may include a display device, a speaker, a printer, and/or the like.

User device 230 includes one or more devices capable of receiving, generating, storing, processing, and/or providing information, such as information described herein. For example, user device 230 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 230 may receive information from and/or transmit information to transaction authorization platform 250, and/or may obtain data concerning transaction card 210 (e.g., via a camera, wireless transceiver, and/or the like of user device 230).

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Transaction authorization platform 250 includes one or more devices capable of determining whether a user of the user device 230 has possession of a transaction card and/or whether the user is authorized to possess the transaction card. In some implementations, transaction authorization platform 250 may be designed to be modular such that certain software components may be swapped in or out depending on a particular need. As such, transaction authorization platform 250 may be easily and/or quickly reconfigured for different uses. In some implementations, transaction authorization platform may receive information from and/or transmit information to transaction terminal 220 and/or user device 230, such as via network 240.

In some implementations, as shown, transaction authorization platform 250 may be hosted in a cloud computing environment 252. Notably, while implementations described herein describe transaction authorization platform 250 as being hosted in cloud computing environment 252, in some implementations, transaction authorization platform 250 may be non-cloud-based (i.e., may be implemented outside of a cloud computing environment) or may be partially cloud-based.

Cloud computing environment 252 includes an environment that hosts transaction authorization platform 250. Cloud computing environment 252 may provide computation, software, data access, storage, etc. services that do not require end-user knowledge of a physical location and configuration of system(s) and/or device(s) that hosts transaction authorization platform 250. As shown, cloud computing environment 252 may include a group of computing resources 254 (referred to collectively as "computing resources 254" and individually as "computing resource 254").

Computing resource 254 includes one or more personal computers, workstation computers, server devices, or other types of computation and/or communication devices. In some implementations, computing resource 254 may host transaction authorization platform 250. The cloud resources may include compute instances executing in computing resource 254, storage devices provided in computing resource 254, data transfer devices provided by computing resource 254, etc. In some implementations, computing resource 254 may communicate with other computing resources 254 via wired connections, wireless connections, or a combination of wired and wireless connections.

As further shown in FIG. 2, computing resource 254 includes a group of cloud resources, such as one or more applications ("APPs") 254-1, one or more virtual machines ("VMs") 254-2, virtualized storage ("VSs") 254-3, one or more hypervisors ("HYPs") 254-4, and/or the like.

Application 254-1 includes one or more software applications that may be provided to or accessed by transaction terminal 220 and/or user device 230. Application 254-1 may eliminate a need to install and execute the software applications on transaction terminal 220 and/or user device 230. For example, application 254-1 may include software associated with transaction authorization platform 250 and/or any other software capable of being provided via cloud computing environment 252. In some implementations, one application 254-1 may send/receive information to/from one or more other applications 254-1, via virtual machine 254-2.

Virtual machine 254-2 includes a software implementation of a machine (e.g., a computer) that executes programs like a physical machine. Virtual machine 254-2 may be either a system virtual machine or a process virtual machine, depending upon use and degree of correspondence to any real machine by virtual machine 254-2. A system virtual machine may provide a complete system platform that supports execution of a complete operating system ("OS"). A process virtual machine may execute a single program, and may support a single process. In some implementations, virtual machine 254-2 may execute on behalf of a user (e.g., a user of transaction terminal 220 and/or user device 230 or an operator of transaction authorization platform 250), and may manage infrastructure of cloud computing environment 252, such as data management, synchronization, or long-duration data transfers.

Virtualized storage 254-3 includes one or more storage systems and/or one or more devices that use virtualization techniques within the storage systems or devices of computing resource 254. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 254-4 may provide hardware virtualization techniques that allow multiple operating systems (e.g., "guest operating systems") to execute concurrently on a host computer, such as computing resource 254. Hypervisor 254-4 may present a virtual operating platform to the guest operating systems, and may manage the execution of the guest operating systems. Multiple instances of a variety of operating systems may share virtualized hardware resources.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
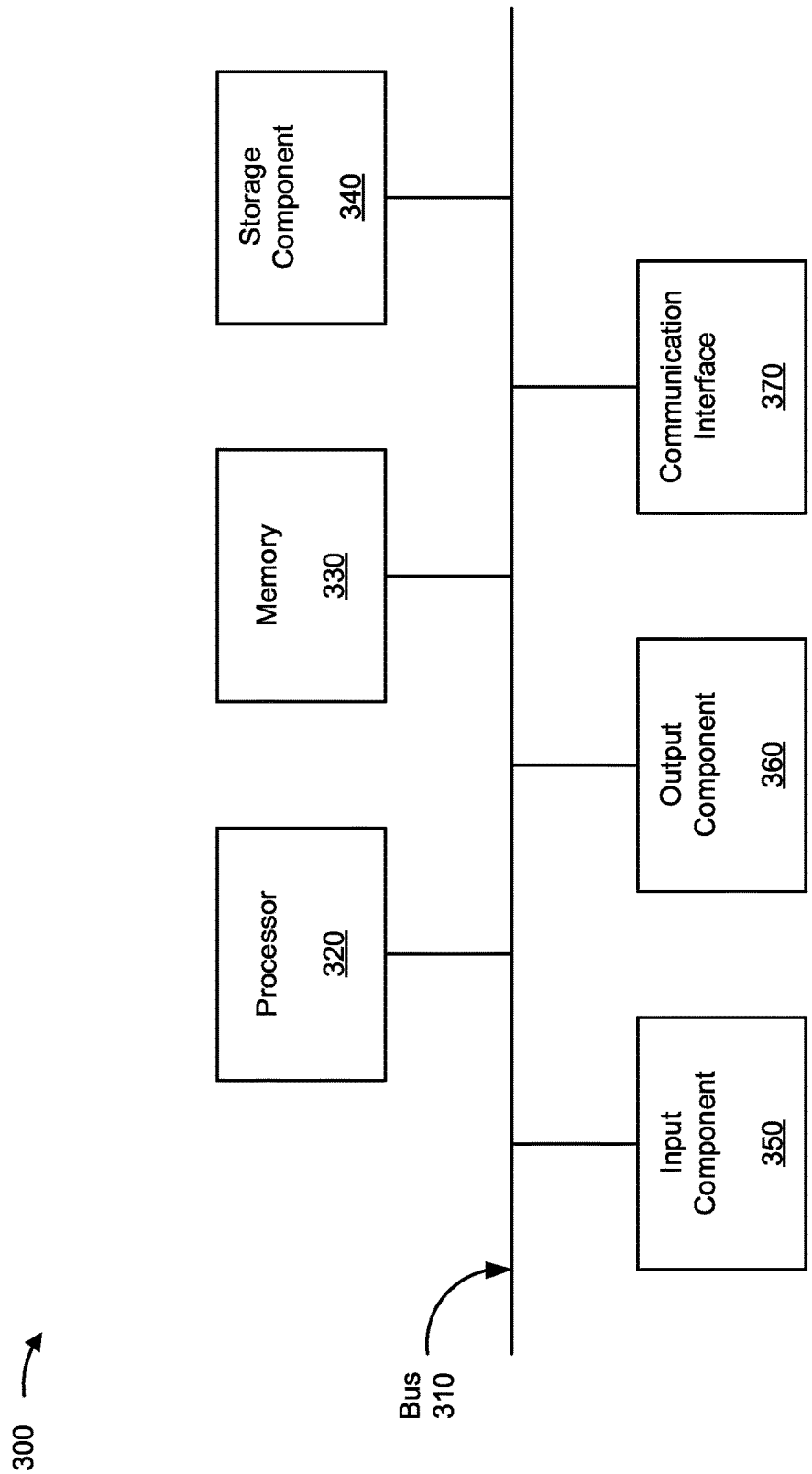
FIG. 3 is a diagram of example components of one or more devices of FIG. 2.

FIG. 3 is a diagram of example components of a device 300. Device 300 may correspond to transaction card 210, transaction terminal 220, user device 230, transaction authorization platform 250, and/or the like. In some implementations, transaction card 210, transaction terminal 220, user device 230, transaction authorization platform 250, and/or the like may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
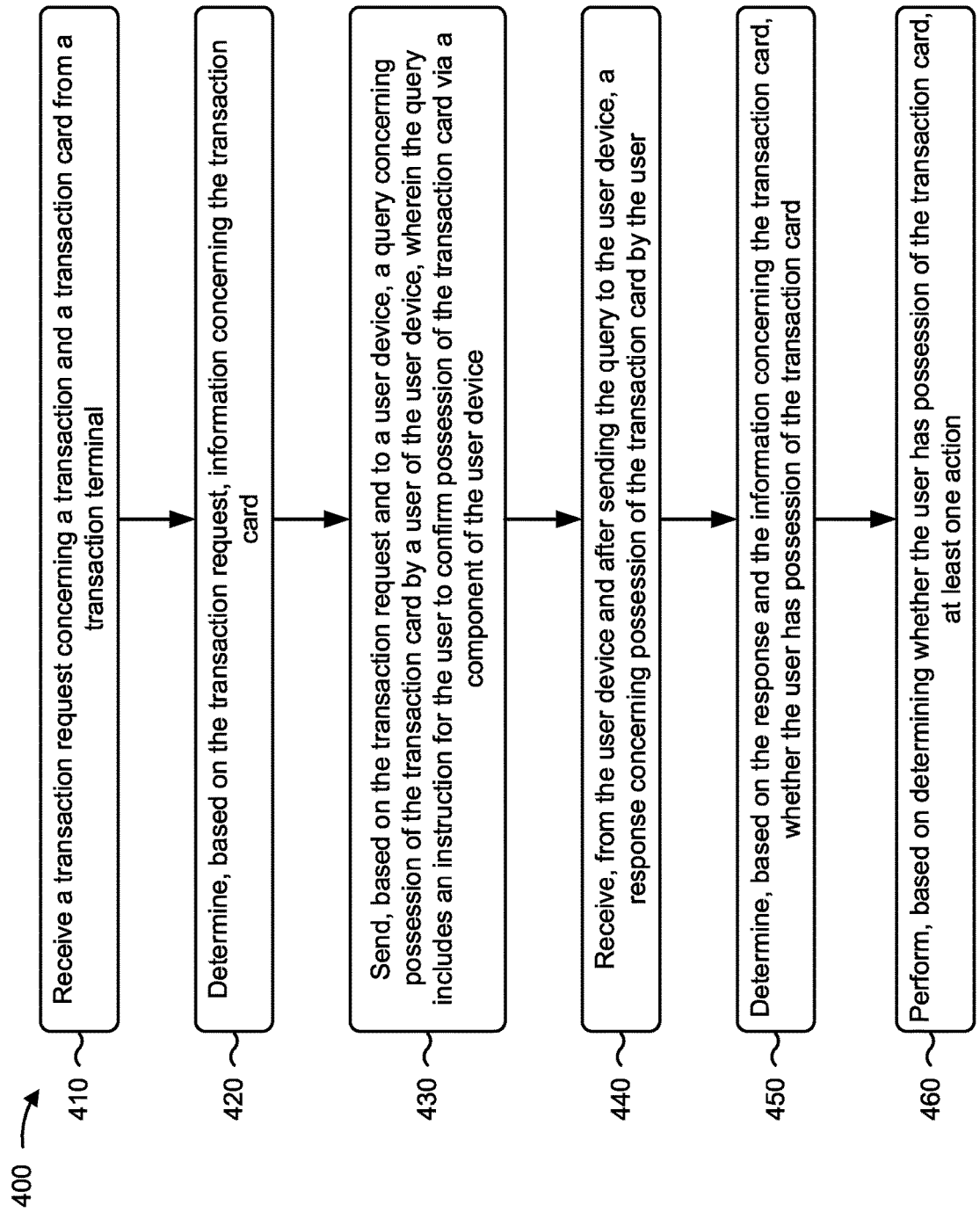
FIGS. 4-6 are flow charts of example processes for determining whether a user has possession of a transaction card and/or whether the user is authorized to possess the transaction card.

FIG. 4 is a flow chart of an example process 400 for determining whether a user has possession of a transaction card and/or whether the user is authorized to possess the transaction card. In some implementations, one or more process blocks of FIG. 4 may be performed by a transaction authorization platform (e.g., transaction authorization platform 250). In some implementations, one or more process blocks of FIG. 4 may be performed by another device or a group of devices separate from or including the transaction authorization platform, such as a transaction card (e.g., transaction card 210), a transaction terminal (e.g., transaction terminal 220), a user device (e.g., user device 230), and/or the like.

As shown in FIG. 4, process 400 may include receiving a transaction request concerning a transaction and a transaction card from a transaction terminal (block 410). For example, the transaction authorization platform (e.g., using processor 320, memory 330, storage component 340, input component 350, communication interface 370, and/or the like) may receive a transaction request concerning a transaction and a transaction card from a transaction terminal, as described above.

As further shown in FIG. 4, process 400 may include determining, based on the transaction request, information concerning the transaction card (block 420). For example, the transaction authorization platform (e.g., using processor 320, memory 330, storage component 340, and/or the like) may determine, based on the transaction request, information concerning the transaction card, as described above.

As further shown in FIG. 4, process 400 may include sending, based on the transaction request and to a user device, a query concerning possession of the transaction card by a user of the user device, wherein the query includes an instruction for the user to confirm possession of the transaction card via a component of the user device (block 430). For example, the transaction authorization platform (e.g., using processor 320, memory 330, storage component 340, output component 360, communication interface 370, and/or the like) may send, based on the transaction request and to a user device, a query concerning possession of the transaction card by a user of the user device, as described above. In some implementations, the query may include an instruction for the user to confirm possession of the transaction card via a component of the user device.

As further shown in FIG. 4, process 400 may include receiving, from the user device and after sending the query to the user device, a response concerning possession of the transaction card by the user (block 440). For example, the transaction authorization platform (e.g., using processor 320, memory 330, storage component 340, input component 350, communication interface 370, and/or the like) may receive, from the user device and after sending the query to the user device, a response concerning possession of the transaction card by the user, as described above.

As further shown in FIG. 4, process 400 may include determining, based on the response and the information concerning the transaction card, whether the user has possession of the transaction card (block 450). For example, the transaction authorization platform (e.g., using processor 320, memory 330, storage component 340, and/or the like) may determine, based on the response and the information concerning the transaction card, whether the user has possession of the transaction card, as described above.

As further shown in FIG. 4, process 400 may include performing, based on determining whether the user has possession of the transaction card, at least one action (block 460). For example, the transaction authorization platform (e.g., using processor 320, memory 330, storage component 340, input component 350, communication interface 370, and/or the like) may perform, based on determining whether the user has possession of the transaction card, at least one action, as described above.

Process 400 may include additional implementations, such as any single implementation or any combination of implementations described below and/or in connection with one or more other processes described elsewhere herein.

In some implementations, the instruction may indicate that the user is to confirm possession of the transaction card via a near field communication (NFC) component of the user device, where the query causes the user device to operate the NFC component of the user device to communicate with an integrated circuit (IC) chip of the transaction card to determine IC chip data concerning the transaction card, and where the response is based on the IC chip data.

In some implementations, the instruction may indicate that the user is to confirm possession of the transaction card via a camera device of the user device, where the query causes the user device to operate the camera device of the user device to obtain image data concerning the transaction card, and where the response is based on the image data.

In some implementations, the response may include integrated circuit (IC) chip data concerning the transaction card and, when determining whether the user has possession of the transaction card, the transaction authorization platform may determine whether the IC chip data is associated with the information concerning the transaction card.

In some implementations, the response may include image data concerning the transaction card and, when determining whether the user has possession of the transaction card, the transaction authorization platform may process the image data using an optical character recognition (OCR) technique to determine an account number of the transaction card, and may determine whether the account number is associated with the information concerning the transaction card.

In some implementations, the response may include image data and, when determining whether the user has possession of the transaction card, the transaction authorization platform may process the image data using an image processing technique to determine one or more images of the transaction card, and may determine whether the one or more images are associated with the information concerning the transaction card.

In some implementations, the response may include image data and, when determining whether the user has possession of the transaction card, the transaction authorization platform may process the image data to determine one or more images of the transaction card, may process the image data to determine one or more images of an identification card associated with the user, and may determine whether the one or more images of the transaction card and the one or more images of the identification card contain image information that corresponds with the information concerning the transaction card.

In some implementations, when performing the at least one action, the transaction authorization platform may send a message to the transaction terminal that causes the transaction terminal to allow the transaction, when the user has been determined to have possession of the transaction card. In some implementations, when performing the at least one action, the transaction authorization platform may send a message to the transaction terminal that causes the transaction terminal to decline the transaction, when the user has been determined to not have possession of the transaction card.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
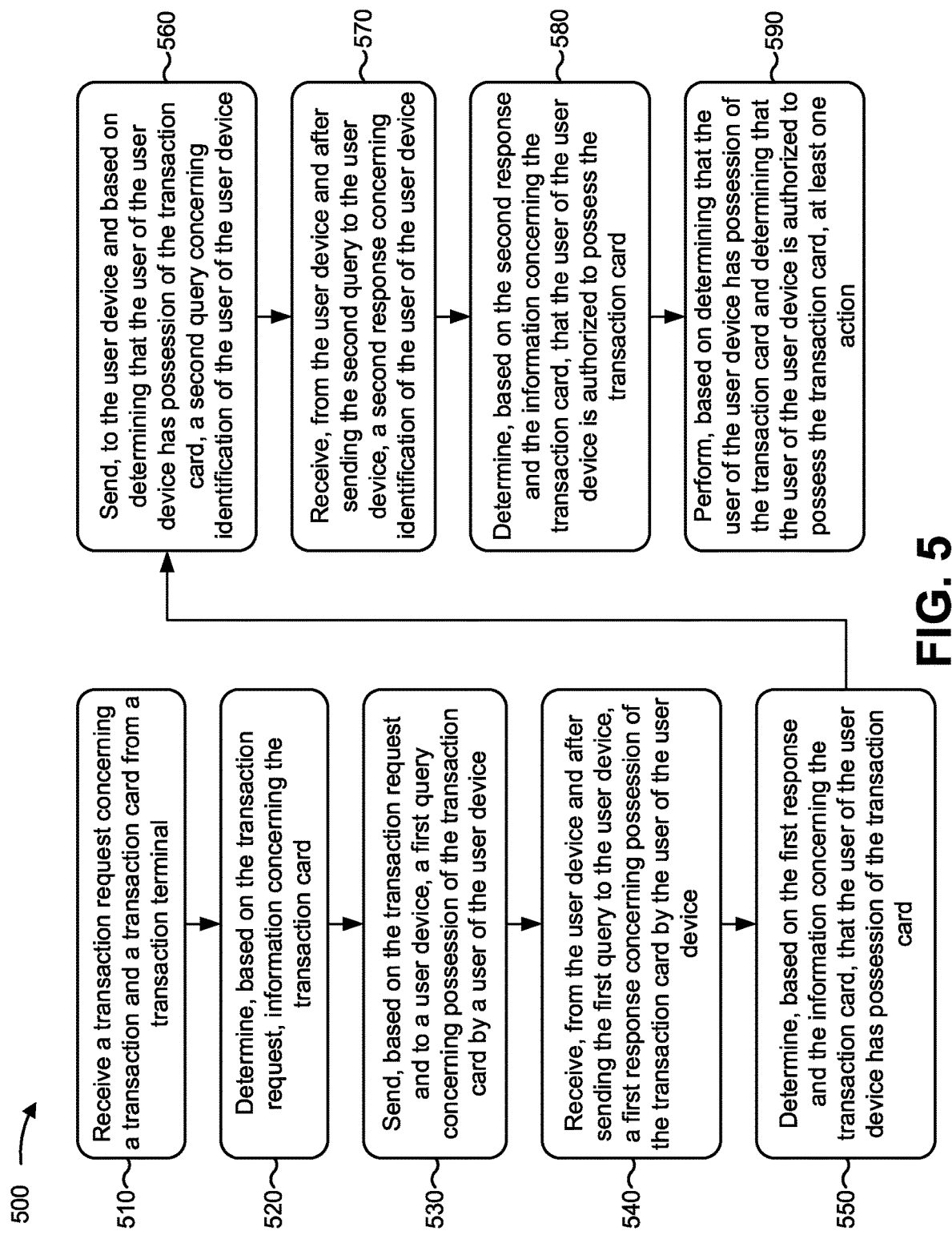

FIG. 5 is a flow chart of an example process 500 for determining whether a user has possession of a transaction card and/or whether the user is authorized to possess the transaction card. In some implementations, one or more process blocks of FIG. 5 may be performed by a transaction authorization platform (e.g., transaction authorization platform 250). In some implementations, one or more process blocks of FIG. 5 may be performed by another device or a group of devices separate from or including the transaction authorization platform, such as a transaction card (e.g., transaction card 210), a transaction terminal (e.g., transaction terminal 220), a user device (e.g., user device 230), and/or the like.

As shown in FIG. 5, process 500 may include receiving a transaction request concerning a transaction and a transaction card from a transaction terminal (block 510). For example, the transaction authorization platform (e.g., using processor 320, memory 330, storage component 340, input component 350, communication interface 370, and/or the like) may receive a transaction request concerning a transaction and a transaction card from a transaction terminal, as described above.

As further shown in FIG. 5, process 500 may include determining, based on the transaction request, information concerning the transaction card (block 520). For example, the transaction authorization platform (e.g., using processor 320, memory 330, storage component 340, and/or the like) may determine, based on the transaction request, information concerning the transaction card, as described above.

As further shown in FIG. 5, process 500 may include sending, based on the transaction request and to a user device, a first query concerning possession of the transaction card by a user (block 530). For example, the transaction authorization platform (e.g., using processor 320, memory 330, storage component 340, output component 360, communication interface 370, and/or the like) may send, based on the transaction request and to a user device, a first query concerning possession of the transaction card by a user, as described above.

As further shown in FIG. 5, process 500 may include receiving, from the user device and after sending the first query to the user device, a first response concerning possession of the transaction card by the user (block 540). For example, the transaction authorization platform (e.g., using processor 320, memory 330, storage component 340, input component 350, communication interface 370, and/or the like) may receive, from the user device and after sending the first query to the user device, a first response concerning possession of the transaction card by the user, as described above.

As further shown in FIG. 5, process 500 may include determining, based on the first response and the information concerning the transaction card, that the user has possession of the transaction card (block 550). For example, the transaction authorization platform (e.g., using processor 320, memory 330, storage component 340, and/or the like) may determine, based on the first response and the information concerning the transaction card, that the user has possession of the transaction card, as described above.

As further shown in FIG. 5, process 500 may include sending, to the user device and based on determining that the user has possession of the transaction card, a second query concerning identification of the user of the user device (block 560). For example, the transaction authorization platform (e.g., using processor 320, memory 330, storage component 340, output component 360, communication interface 370, and/or the like) may send, to the user device and based on determining that the user has possession of the transaction card, a second query concerning identification of the user, as described above.

As further shown in FIG. 5, process 500 may include receiving, from the user device and after sending the second query to the user device, a second response concerning identification of the user (block 570). For example, the transaction authorization platform (e.g., using processor 320, memory 330, storage component 340, input component 350, communication interface 370, and/or the like) may receive, from the user device and after sending the second query to the user device, a second response concerning identification of the user, as described above.

As further shown in FIG. 5, process 500 may include determining, based on the second response and the information concerning the transaction card, that the user is authorized to possess the transaction card (block 580). For example, the transaction authorization platform (e.g., using processor 320, memory 330, storage component 340, and/or the like) may determine, based on the second response and the information concerning the transaction card, that the user is authorized to possess the transaction card, as described above.

As further shown in FIG. 5, process 500 may include performing, based on determining that the user has possession of the transaction card and determining that the user is authorized to possess the transaction card, at least one action (block 590). For example, the transaction authorization platform (e.g., using processor 320, memory 330, storage component 340, input component 350, output component 360, and/or the like) may perform, based on determining that the user has possession of the transaction card and determining that the user is authorized to possess the transaction card, at least one action, as described above.

Process 500 may include additional implementations, such as any single implementation or any combination of implementations described below and/or in connection with one or more other processes described elsewhere herein.

In some implementations, the first response may include a plurality of images of the transaction card, where the plurality of images includes at least one image of a front of the transaction card and at least one image of a back of the transaction card, and, when determining that the user has possession of the transaction card, the transaction authorization platform may determine that the at least one image of the front of the transaction card corresponds with the at least one image of the back of the transaction card, and may determine that the plurality of images contain image information that corresponds with the information concerning the transaction card.

In some implementations, the second response may include audio data, and, when determining that the user is authorized to possess the transaction card, the transaction authorization platform may process the audio data to determine one or more words, and may determine that at least one of the one or more words matches a password included in the information concerning the transaction card.

In some implementations, the second response may include audio data, and, when determining that the user is authorized to possess the transaction card, the transaction authorization platform may process the audio data to determine a voice, and may determine, based on the information concerning the transaction card, that the voice corresponds with a voice profile of an authorized user.

In some implementations, the second response may include image data, and, when determining that the user is authorized to possess the transaction card, the transaction authorization platform may process the image data to determine at least one image of a face, and may determine, based on the information concerning the transaction card, that the at least one image of the face matches a facial profile of an authorized user.

In some implementations, the information concerning the transaction card may indicate that the transaction card may be compromised, and, when performing the at least one action, the transaction authorization platform may update the information concerning the transaction card to indicate that the transaction card has not been compromised.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
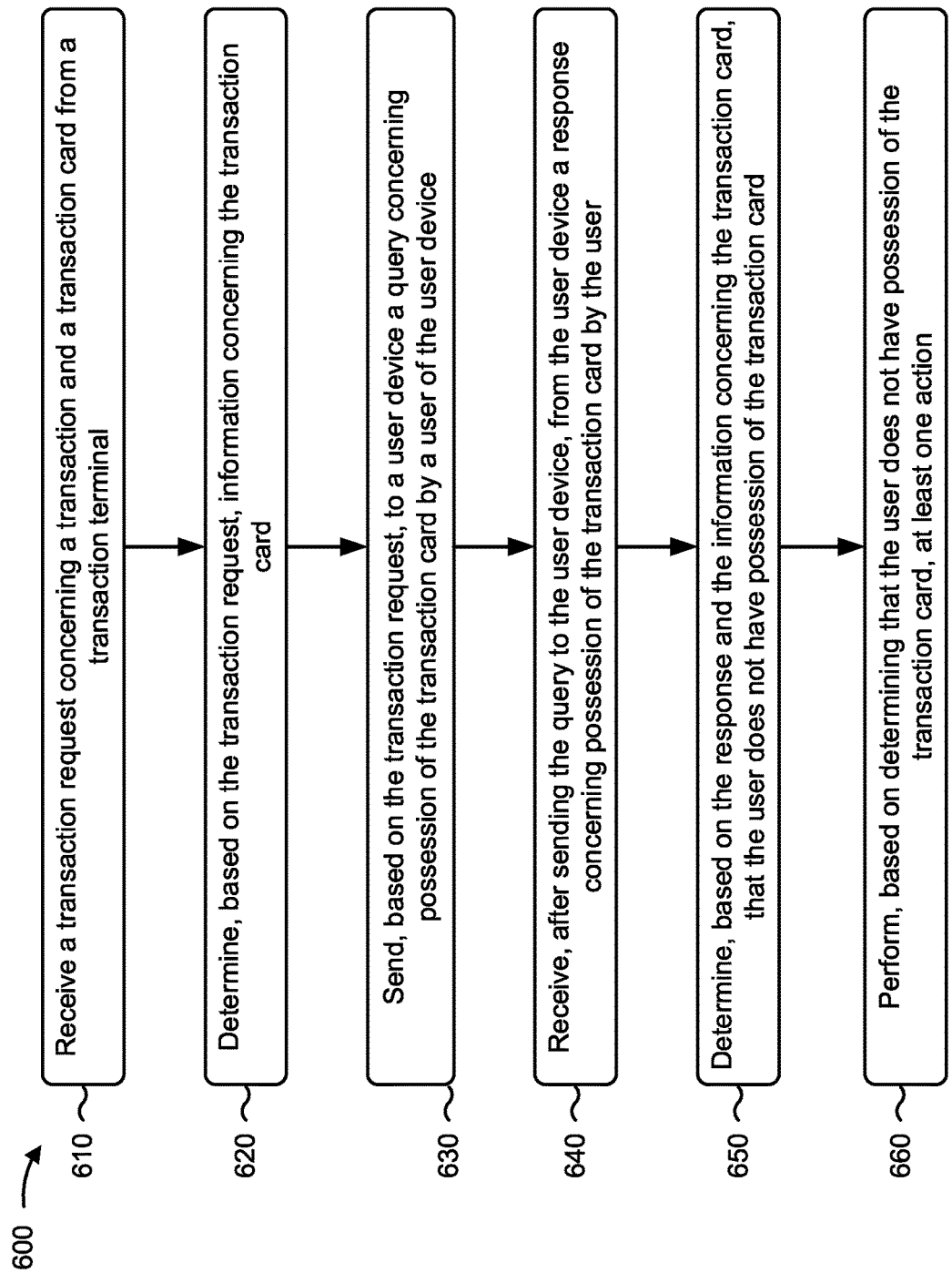

FIG. 6 is a flow chart of an example process 600 for determining whether a user has possession of a transaction card and/or whether the user is authorized to possess the transaction card. In some implementations, one or more process blocks of FIG. 6 may be performed by a transaction authorization platform (e.g., transaction authorization platform 250). In some implementations, one or more process blocks of FIG. 6 may be performed by another device or a group of devices separate from or including the transaction authorization platform, such as a transaction card (e.g., transaction card 210), a transaction terminal (e.g., transaction terminal 220), a user device (e.g., user device 230), and/or the like.

As shown in FIG. 6, process 600 may include receiving a transaction request concerning a transaction and a transaction card from a transaction terminal (block 610). For example, the transaction authorization platform (e.g., using processor 320, memory 330, storage component 340, input component 350, communication interface 370, and/or the like) may receive a transaction request concerning a transaction and a transaction card from a transaction terminal, as described above.

As further shown in FIG. 6, process 600 may include determining, based on the transaction request, information concerning the transaction card (block 620). For example, the transaction authorization platform (e.g., using processor 320, memory 330, storage component 340, and/or the like) may determine, based on the transaction request, information concerning the transaction card, as described above.

As further shown in FIG. 6, process 600 may include sending, by the device and based on the transaction request, to a user device a query concerning possession of the transaction card by a user of the user device (block 630). For example, the transaction authorization platform (e.g., using processor 320, memory 330, storage component 340, output component 360, communication interface 370, and/or the like) may send, by the device and based on the transaction request, to a user device a query concerning possession of the transaction card by a user, as described above.

As further shown in FIG. 6, process 600 may include receiving, after sending the query to the user device, from the user device a response concerning possession of the transaction card by the user (block 640). For example, the transaction authorization platform (e.g., using processor 320, memory 330, storage component 340, input component 350, communication interface 370, and/or the like) may receive, after sending the query to the user device, from the user device a response concerning possession of the transaction card by the user, as described above.

As further shown in FIG. 6, process 600 may include determining, based on the response and the information concerning the transaction card, that the user does not have possession of the transaction card (block 650). For example, the transaction authorization platform (e.g., using processor 320, memory 330, storage component 340, and/or the like) may determine, based on the response and the information concerning the transaction card, that the user does not have possession of the transaction card, as described above.

As further shown in FIG. 6, process 600 may include performing, based on determining that the user does not have possession of the transaction card, at least one action (block 660). For example, the transaction authorization platform (e.g., using processor 320, memory 330, storage component 340, input component 350, output component 360, communication interface 370, and/or the like) may perform, based on determining that the user does not have possession of the transaction card, at least one action, as described above.

Process 600 may include additional implementations, such as any single implementation or any combination of implementations described below and/or in connection with one or more other processes described elsewhere herein.

In some implementations, when performing the at least one action, the transaction authorization platform may update the information concerning the transaction card to indicate that the transaction was attempted when the user did not have possession of the transaction card, and may send a signal to the transaction terminal to decline the transaction.

In some implementations, when performing the at least one action, the transaction authorization platform may cause the transaction terminal to decline the transaction, may cause a different device associated with the transaction card to cancel the transaction card, and may cause the different device or another device to initiate issuance of a new transaction card to the user.

In some implementations, when performing the at least one action, the transaction authorization platform may update the information concerning the transaction card to indicate that card-present transactions are allowed and that card-not-present transactions are not allowed. In some implementations, when performing the at least one action, the transaction authorization platform may cancel the transaction card, and may cause a new transaction card to be issued to the user.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
one or more memories; and
one or more processors, coupled to the one or more memories, configured to:
    receive, from a second device, one or more queries associated with possession of a transaction card by a user of the first device;
    automatically operate, in response to the one or more queries, one or more components of the first device, wherein the one or more components comprises one or more of:
        a camera of the first device, or
        a near field communication (NFC) transceiver of the first device;
    receive, based on operating the one or more components, at least one of:
        an image of the transaction card from the camera, or
        integrated circuit (IC) chip data associated with the transaction card via the NFC transceiver; and
    provide, to the second device and based on receiving at least one of the image or the IC data, a response concerning the possession of the transaction card by the user.

2. The first device of claim 1, wherein the one or more components further comprises at least one of:
a microphone,
a biometric sensor, or
a wireless transceiver.

3. The first device of claim 1, wherein the one or more processors are further configured to:
receive identification data associated with an identification of the user.

4. The first device of claim 3, wherein the identification data comprises at least one of:
audio data associated with the identification of the user,
image data associated with the identification of the user, or
biometric data associated with the identification of the user.

5. The first device of claim 1, wherein a transaction associated with the transaction card is authorized based on the response concerning the possession of the transaction card by the user.

6. The first device of claim 1, wherein a transaction associated with the transaction card is declined based on the response concerning the possession of the transaction card by the user.

7. The first device of claim 1, wherein the transaction card is canceled based on the response concerning the possession of the transaction card by the user.

8. A non-transitory computer-readable medium storing a set of instructions, the set of instructions comprising:
one or more instructions that, when executed by one or more processors of a first device, cause the first device to:
    receive, from a second device, one or more queries associated with possession of a transaction card by a user of the first device;
    automatically operate, in response to the one or more queries, one or more components of the first device, wherein the one or more components comprises one or more of:
        a camera of the first device, or
        a near field communication (NFC) transceiver of the first device;
    receive, based on operating the one or more components, at least one of:
        an image of the transaction card from the camera, or
        integrated circuit (IC) chip data associated with the transaction card via the NFC transceiver; and
    provide, to the second device and based on receiving at least one of the image or the IC data, a response concerning the possession of the transaction card by the user.

9. The non-transitory computer-readable medium of claim 8, wherein the one or more components further comprises at least one of:
a microphone,
a biometric sensor, or
a wireless transceiver.

10. The non-transitory computer-readable medium of claim 8, wherein the one or more instructions further cause the first device to:
receive identification data associated with an identification of the user.

11. The non-transitory computer-readable medium of claim 10, wherein the identification data comprises at least one of:
audio data associated with the identification of the user,
image data associated with the identification of the user, or
biometric data associated with the identification of the user.

12. The non-transitory computer-readable medium of claim 8, wherein a transaction associated with the transaction card is authorized based on the response concerning the possession of the transaction card by the user.

13. The non-transitory computer-readable medium of claim 8, wherein a transaction associated with the transaction card is declined based on the response concerning the possession of the transaction card by the user.

14. The non-transitory computer-readable medium of claim 8, wherein the transaction card is canceled based on the response concerning the possession of the transaction card by the user.

15. A method, comprising:
receiving, by a first device and from a second device, one or more queries associated with possession of a transaction card by a user of the first device;
automatically operating, by the first device in response to the one or more queries, one or more components of the first device,
    wherein the one or more components comprises one or more of:

a camera of the first device, or
a near field communication (NFC) transceiver of the first device;
receiving, by the first device and based on operating the one or more components, at least one of:
an image of the transaction card from the camera, or
integrated circuit (IC) chip data associated with the transaction card via the NFC transceiver; and
providing, by the first device, to the second device, and based on receiving at least one of the image or the IC data, a response concerning the possession of the transaction card by the user.

16. The method of claim 15, wherein the one or more components further comprises at least one of:
a microphone,
a biometric sensor, or
a wireless transceiver.

17. The method of claim 15, wherein the method further comprises:
receiving identification data associated with an identification of the user.

18. The method of claim 17, wherein the identification data comprises at least one of:
audio data associated with the identification of the user,
image data associated with the identification of the user, or
biometric data associated with the identification of the user.

19. The method of claim 15, wherein a transaction associated with the transaction card is authorized based on the response concerning the possession of the transaction card by the user.

20. The method of claim 15, wherein a transaction associated with the transaction card is declined based on the response concerning the possession of the transaction card by the user.

* * * * *